United States Patent
Otaka et al.

(10) Patent No.: US 11,451,942 B2
(45) Date of Patent: Sep. 20, 2022

(54) COMMUNICATION CONTROL DEVICE, COMMUNICATION DEVICE, COMMUNICATION SYSTEM, RADIO BASE STATION, COMMUNICATION CONTROL METHOD, AND STORAGE MEDIUM

(71) Applicant: HONDA MOTOR CO., LTD., Tokyo (JP)

(72) Inventors: Masaru Otaka, Wako (JP); Ryusuke Tamanaha, Wako (JP); Yusuke Oi, Tokyo (JP); Takahiro Iijima, Tokyo (JP); Naoko Imai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/173,215

(22) Filed: Feb. 11, 2021

(65) Prior Publication Data

US 2021/0258750 A1 Aug. 19, 2021

(30) Foreign Application Priority Data

Feb. 19, 2020 (JP) .............................. JP2020-026520

(51) Int. Cl.
*H04W 4/40* (2018.01)
*H04W 72/12* (2009.01)
(Continued)

(52) U.S. Cl.
CPC ............... *H04W 4/40* (2018.02); *H04W 4/38* (2018.02); *H04W 72/0453* (2013.01);
(Continued)

(58) Field of Classification Search
CPC ..... H04W 4/38; H04W 4/40; H04W 72/0453; H04W 72/087; H04W 72/10; H04W 72/1242; H04W 72/1247
See application file for complete search history.

(56) References Cited

U.S. PATENT DOCUMENTS

2012/0083998 A1* 4/2012 Kizaki ................... G08G 1/093
                                                          701/300
2020/0288288 A1* 9/2020 Lee ......................... H04W 4/44
(Continued)

FOREIGN PATENT DOCUMENTS

| JP | 2011-142385 | 7/2011 |
|----|-------------|--------|
| JP | 2017-098962 | 6/2017 |
| JP | 2017-120997 | 7/2017 |

*Primary Examiner* — Kashif Siddiqui
(74) *Attorney, Agent, or Firm* — Amin, Turocy & Watson, LLP

(57) ABSTRACT

A communication control device includes an acquisition part configured to acquire vehicle information, which is information related to a vehicle and which is to be transmitted to an external device outside the vehicle from one or more on-vehicle instrument mounted on the vehicle, a determination part configured to determine a first communication priority level of the vehicle information on the basis of at least the vehicle information acquired by the acquisition part for each vehicle information, a first controller configured to cause a communication part to transmit information showing the first communication priority level determined by the determination part to a radio base station to which the communication part accesses to communicate with the external device, and a second controller configured to cause the communication part to perform communication of the vehicle information with the radio base station with a second communication priority level received from the radio base station.

12 Claims, 5 Drawing Sheets

(51) Int. Cl.
H04W 72/04 (2009.01)
H04W 4/38 (2018.01)
H04W 72/08 (2009.01)

(52) U.S. Cl.
CPC ..... H04W 72/087 (2013.01); H04W 72/1242 (2013.01); H04W 72/1247 (2013.01)

(56) References Cited

U.S. PATENT DOCUMENTS

2020/0322830 A1* 10/2020 Nagamura .............. G08G 1/164
2021/0258982 A1*  8/2021 Otaka ............... H04W 28/0226

* cited by examiner

FIG. 2

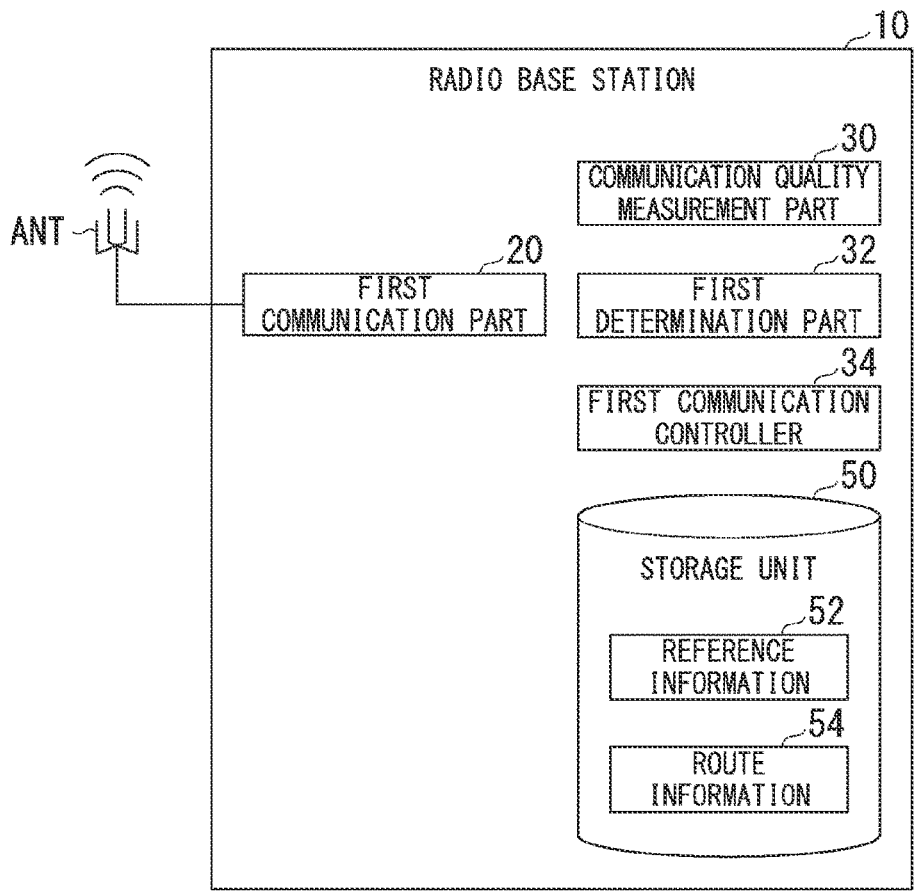

FIG. 3

| IDENTIFICATION INFORMATION | TYPE OF TRANSMISSION SOURCE INSTRUMENT | TRANSMISSION DATA TYPE | COMMUNICATION PRIORITY LEVEL |
|---|---|---|---|
| *** | VEHICLE | ***(VEHICLE INFORMATION:USED FOR CONTROL) | 8 |
| *** | VEHICLE | ***(VEHICLE INFORMATION:NOT USED FOR CONTROL) | 6 |
| *** | VEHICLE | ***(VEHICLE INFORMATION:CONTENTS INFORMATION) | 3 |
| *** | SMART PHONE | ***(CALL INFORMATION) | 8 |
| *** | SMART PHONE | ***(CONTENT INFORMATION) | 4 |
| *** | GAME MACHINE | ***(GAME INFORMATION) | 2 |
| ... | ... | ... | ... |

| COMMUNICATION PRIORITY LEVEL | TYPE OF VEHICLE INFORMATION |
|---|---|
| 8 | DETECTION RESULT OF VEHICLE SENSOR (USED FOR CONTROL) |
| | IMAGE DATA IMAGED BY CAMERA (USED FOR CONTROL) |
| | VEHICLE POSITION INFORMATION (NOT USED FOR CONTROL) |
| 3 | CONTENTS INFORMATION |

| IDENTIFICATION INFORMATION | TYPE OF TRANSMISSION SOURCE INSTRUMENT | TRANSMISSION DATA TYPE | COMMUNICATION BAND |
|---|---|---|---|
| *** | VEHICLE | ***(VEHICLE INFORMATION:USED FOR CONTROL) | 5G:WIDE |
| *** |  | ***(VEHICLE INFORMATION:NOT USED FOR CONTROL) | 5G:NARROW |
| *** |  | ***(VEHICLE INFORMATION:CONTENTS INFORMATION) | 4G:WIDE |
| *** | SMART PHONE | ***(CALL INFORMATION) | 5G:WIDE |
| *** |  | ***(CONTENT INFORMATION) | 4G:WIDE |
| *** | GAME MACHINE | ***(GAME INFORMATION) | 4G:NARROW |
| ... | ... | ... | ... |

COMMUNICATION CONTROL DEVICE, COMMUNICATION DEVICE, COMMUNICATION SYSTEM, RADIO BASE STATION, COMMUNICATION CONTROL METHOD, AND STORAGE MEDIUM

CROSS-REFERENCE TO RELATED APPLICATION

Priority is claimed on Japanese Patent Application No. 2020-026520, filed Feb. 19, 2020, the content of which is incorporated herein by reference.

BACKGROUND OF THE INVENTION

Field of the Invention

The present invention relates to a communication control device, a communication device, a communication system, a radio base station, a communication control method, and a storage medium.

Description of Related Art

In recent years, a technology related to a communication system that gives priority to communication with a terminal device in which contents are being reproduced has become known (for example, see Japanese Unexamined Patent Application, First Publication No. 2017-120997). In addition, a technology related to a communication system configured to determine a communication band according to a type of application executed by a terminal device in communication according to the application is known (for example, see Japanese Unexamined Patent Application, First Publication No. 2017-98962). In addition, a technology in which a relay that connects different networks relays communication according to a priority requested from a terminal device is known (for example, see Japanese Unexamined Patent Application, First Publication No. 2011-142385).

SUMMARY OF THE INVENTION

Here, in recent years, research has been carried out on automatically controlling vehicles. Automatically controlling vehicles requests transmitting and receiving a large amount of information according to control of the vehicles with priority or improved reliability through high-speed and low-delay communication. However, in the technology in the related art, it has been difficult to preferentially communicate information related to the vehicles while ensuring reliability.

An aspect of the present invention is directed to providing a communication control device, a communication device, a communication system, a radio base station, a communication control method, and a storage medium that are capable of preferentially communicating information according to a vehicle while ensuring reliability.

A communication control device, a communication device, a communication system, a radio base station, a communication control method, and a storage medium according to the present invention employ the following configurations.

(1) A communication control device of an aspect of the present invention includes an acquisition part configured to acquire vehicle information, which is information related to a vehicle and which is to be transmitted to an external device outside the vehicle, from one or more on-vehicle instruments mounted on the vehicle; a determination part configured to determine a first communication priority level of the vehicle information on the basis of at least the vehicle information acquired by the acquisition part; a first controller configured to cause a communication part to perform transmission of information showing the first communication priority level determined by the determination part to a radio base station to which the communication part accesses in order to communicate with the external device; and a second controller configured to cause the communication part to perform communication of the vehicle information to the radio base station in accordance with a second communication priority level received from the radio base station.

(2) A communication device of another aspect of the present invention may include the communication control device according to the above-mentioned (1); and the communication part, and the communication part may perform communication of the vehicle information with the radio base station in accordance with the second communication priority level received from the radio base station.

(3) In the communication device according to the aspect of the above-mentioned (2), the determination part may determine the first communication priority level on the basis of status information that shows a traveling state of the vehicle.

(4) In the communication device according to the aspect of the above-mentioned (2) or (3), the determination part may determine a first communication band communicating with the radio base station as the first communication priority level of the vehicle information.

(5) In the communication device according to the aspect of the above-mentioned (3) or (4), the radio base station may assign a second communication band for communicating with the communication part as the second communication priority level, and the communication part may perform communication of the vehicle information with the external device by the second communication band which is assigned by the radio base station.

(6) In the communication device according to the aspect of any one of the above-mentioned (3) to (5), the second communication priority level may be a priority level of Quality of Service (QoS) regarding a channel of wireless communication relayed by the radio base station.

(7) A communication system of another aspect of the present invention includes the communication device according to the aspect of any one of the above-mentioned (2) to (6); and the radio base station.

(8) A radio base station of another aspect of the present invention includes a communication controller configured to allow a vehicle and an external device to communicate with each other, the communication controller causing the vehicle and the external device to communicate with each other on the basis of (i) information showing a first communication priority level of communication related to vehicle information obtained from one or more on-vehicle instrument mounted on the vehicle at between the vehicle and the external device, (ii) information including the vehicle information, and (iii) information showing a communication quality of wireless communication, and the first communication priority level is determined on the basis of the vehicle information.

(9) The radio base station according to the aspect of the above-mentioned (8) may further include a communication part configured to receive information showing the first communication priority level, which is determined in the vehicle according to a type of the vehicle information, from the vehicle, and transmit a response with respect to the received first communication priority level to the vehicle, and the communication part may determine a second communication priority level on the basis of the information showing the first communication priority level and the information showing the communication quality, transmits the second communication priority level to the vehicle as the response, and receives the vehicle information from the vehicle on the basis of the second communication priority level in communication between the vehicle and the external device.

(10) In the radio base station according to the aspect of the above-mentioned (8) or (9), the vehicle information may be information showing a detection result of a detection part mounted on the vehicle and configured to detect a state of the vehicle.

(11) A communication control method of another aspect of the present invention is performed by a computer comprising a communication part, the method including: acquiring vehicle information which is information related to a vehicle obtained from one or more on-vehicle instruments mounted on the vehicle and which is to be transmitted to an external device outside the vehicle; determining a first communication priority level of the vehicle information for each of the vehicle information on the basis of the acquired vehicle information; causing the communication part to perform transmission of information showing the determined first communication priority level to a radio base station to which the communication part accesses in order to perform communication with the external device; and causing the communication part to perform communication of the vehicle information to the radio base station in accordance with a second communication priority level received from the radio base station.

(12) A computer-readable storage medium according to another aspect of the present invention on which a program is stored causes a computer including a communication part to; acquire vehicle information which is information related to a vehicle obtained from one or more on-vehicle instrument mounted on the vehicle and which is to be transmitted to an external device outside the vehicle; determine a first communication priority level of the vehicle information for each of the vehicle information on the basis of the acquired vehicle information; cause the communication part to perform transmission of information showing the determined first communication priority level to a radio base station to which the communication part accesses in order to perform communication with the external device; and cause the communication part to perform communication of the vehicle information with the radio base station in accordance with a second communication priority level received from the radio base station.

According to the aspect of the above-mentioned (1) to (10), the information according to the vehicle can be preferentially communicated while securing reliability.

According to the aspect of the above-mentioned (3), the communication can be preferentially performed according to a situation of the vehicle.

According to the aspect of the above-mentioned (5), the information according to the vehicle can be communicated with a band that is a bandwidth guaranteed.

BRIEF DESCRIPTION OF THE DRAWINGS

FIG. 2 is a configuration view of a radio base station of the embodiment.

FIG. 3 is a view showing an example of contents of reference information.

FIG. 8 is a view showing an example of contents of reference information used when a first determination part determines a communication band.

DETAILED DESCRIPTION OF THE INVENTION

Hereinafter, an embodiment of a communication control device, a communication device, a communication system, a radio base station, a communication control method, and a program of the present invention will be described with reference to the accompanying drawings. Hereinafter, the communication system including a vehicle in which the communication device is mounted will be described. The vehicle is, for example, a two-wheeled, a three-wheeled, or a four-wheeled vehicle, or the like, and a driving source thereof is an internal combustion engine such as a diesel engine, a gasoline engine, or the like, an electric motor, or a combination thereof. The electric motor is operated using generated output by a generator connected to an internal combustion engine, or discharged energy of a secondary battery or a fuel cell.

Embodiment

Figure 1:
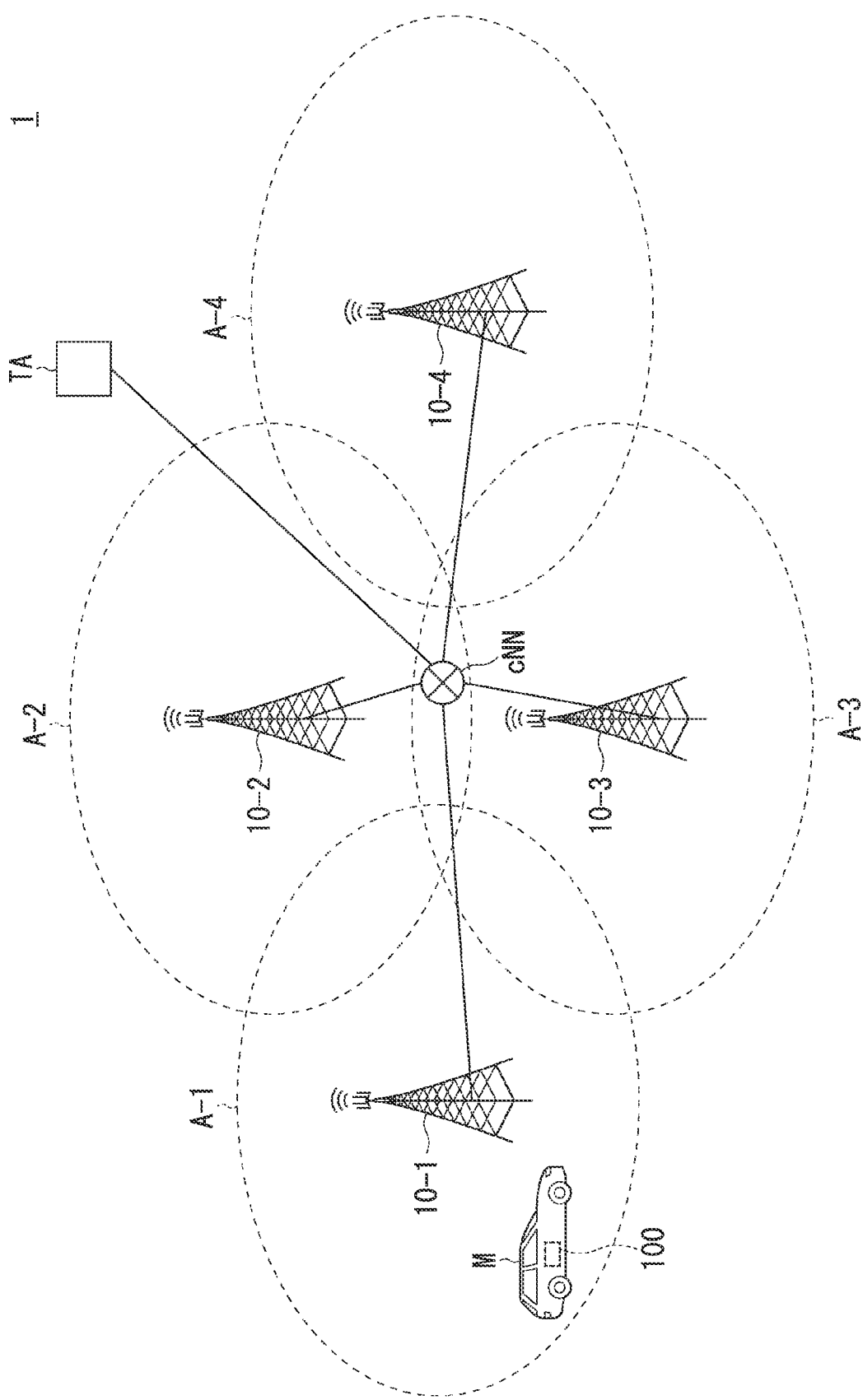
FIG. 1 is a view showing an example of a communication system including a vehicle provided with a communication device of an embodiment.

FIG. 1 is a view showing an example of a communication system including a vehicle provided with a communication device of an embodiment. A communication system 1 includes, for example, one or more radio base stations 10, and a communication device 100 mounted on a vehicle M. Hereinafter, the case in which the communication system 1 includes four base stations such as radio base stations 10-1 to 10-4 will be described. A numerical character after a hyphen at an end of a reference sign is an identifier configured to distinguish the radio base station 10 and components related to the radio base station 10. When the radio base stations 10 are not distinguished or the components related to the radio base stations 10 are not distinguished, the numerical character after the hyphen at the end of the reference sign will be omitted.

The radio base station 10 performs communication with the vehicle M present within a predetermined communication range A or other communication terminal devices through wireless communication. The predetermined communication range A is set by, for example, a communication standard or the like, and is a range of about several hundreds of [m] to several kilo[m] around the radio base station 10. A communication network provided within the communication range A by the radio base station 10 is, for example, a cellular network. The cellular network is, for example, a third-generation mobile communication network (3G), a fourth-generation mobile communication network (hereinafter, 4G, (long term evolution (LTE, registered trademark)), a fifth-generation mobile communication network (hereinafter, 5G), or the like. Hereinafter, communication networks provided within the communication range A by the radio base stations 10 are two types of mobile communication networks, for example, 4G and 5G.

Further, the radio base station 10 is connected to a plurality of access points in a wired manner, and communication ranges (not shown) in which the access points are realized may be integrated to realize the communication range A.

In addition, the radio base stations 10 are connected to communicate with each other via a network (hereinafter, a core network cNW) in a wired manner. The core network cNW includes, for example, the Internet, a wide area network (WAN), a local area network (LAN), a public line, a provider device, a private line, and the like.

The communication device 100 determines a communication priority level (a first communication priority level) of communication according to an external device TA of a communication object and vehicle information, and requests the radio base station 10 to communicate with the external device TA according to the determined communication priority level. The communication device 100 performs communication related to the external device TA and the vehicle information according to the communication priority level when communication with the external device TA according to the communication priority level is accepted which was requested by the radio base station 10. For example, the external device TA is an application server configured to acquire vehicle information from the communication device 100 and transmit the information to the vehicle M. Specifically, the external device TA is a device that constitutes a driving assistance system configured to receive vehicle information from one or more vehicles M, generate information related to traveling assistance of the vehicle M and transmit the information to the vehicle M. The external device TA is connected to the core network cNW in a wired manner. In addition, the external device TA is provided outside the vehicle M.

The vehicle information is, for example, detection results of various vehicle sensors mounted on the vehicle M, image data generated by imaging an ambient environment of the vehicle M using cameras mounted on the vehicle M, content information to be reproduced by a content reproduction apparatus or the like mounted on the vehicle M, and information (in particular, biological information) or the like related to a state of an occupant in the vehicle M, or the like. Further, these pieces of vehicle information are exemplary and not limited thereto. The various types of vehicle sensors are an example of "a detection part configured to detect a state of the vehicle."

Next, the configuration of the radio base station 10 and the configuration of the vehicle M on which the communication device 100 is mounted will be described in detail.

[Radio Base Station]

FIG. 2 is a configuration view of the radio base station 10 of the embodiment. The radio base station 10 is a wireless communication base station provided by a communication service provider, for example, eNodeB, gNodeB, or the like. The radio base station 10 includes, for example, a first communication part 20, a communication quality measurement part 30, a first determination part 32, a first communication controller 34 and a storage unit 50. Further, there is no limitation to a configuration in which the radio base station 10 includes all of these functional units, and an apparatus (not shown) for managing the radio base station 10 may include some or all of them (except the first communication part 20).

The first determination part 32 and the first communication controller 34 are realized by executing a program (software) using a hardware processor, for example, a central processing unit (CPU) or the like. In addition, some or all of these components may be realized by hardware (a circuit part; including circuitry) such as a large scale integration (LSI), an application specific integrated circuit (ASIC), a field-programmable gate array (FPGA), a graphics processing unit (GPU), or the like, or may be realized by cooperation of software and hardware. The program may be previously stored in the storage unit 50, may be stored on a detachable storage medium such as a DVD, a CD-ROM, or the like, or may be installed in the storage unit 50 by mounting the storage medium on a drive device.

The storage unit 50 is realized by, for example, a hard disk drive (HDD), a flash memory, an electrically erasable programmable read only memory (EEPROM), a read only memory (ROM), a random access memory (RAM), or the like. For example, reference information 52, route information 54, a program executed by being read by a processor, other various information, and the like, are stored in the storage unit 50.

FIG. 3 is a view showing an example of contents of the reference information 52. The reference information 52 is information used when the first determination part 32 determines a communication priority level of transmission data (a second communication priority level). The reference information 52 is, for example, information in which identification information that enables identification of a transmission source device of a transmission source of transmission data, information showing a type of the transmission source device, information showing a type of transmission data transmitted by the transmission source device, and the information showing a communication priority level of the transmission data are associated with each other. The identification information that enables identification of the transmission source device is, for example, identification information stored in a subscriber identity module (SIM) card used when wireless communication provided by the radio base station 10 is used. For example, the reference information 52 is previously determined by a service provider that provides the communication system 1.

In FIG. 3, the type of the transmission source device is, for example, the vehicle M, an on-vehicle instrument mounted on the vehicle M, the communication device 100, a smart phone, a game machine, or the like. When the transmission source device is the vehicle M, the on-vehicle instrument mounted on the vehicle M, or the communication device 100, the transmission data transmitted from the transmission source device is, for example, vehicle information. When the transmission source device is a smartphone, the transmission data transmitted from the transmission source device is, for example, call information showing a voice of a call or content information reproduced in the smartphone. When the transmission source device is a game machine, the transmission data transmitted from the transmission source device is, for example, game information such as various types of data or the like used in a game.

In addition, in FIG. 3, a communication priority level corresponds to each of transmission data. The communication priority level is, for example, a communication priority level used in Quality of Service (QoS) related to a channel of wireless communication, and realized by a class of service (CoS) expressed by data of 3 bits in a virtual LAN (VLAN) tag of a media access control (MAC) frame, an inter-switch link (ISL) type CoS expressed by 8 steps using information of lower 3 bits of a "user definition" field in an ISL header, ToS expressed by 8 steps using information (IP Precedence) of 3 bits of a "type of service (ToS)" field in the Internet protocol (IP) header, a DiffServ code point (DSCP) expressed by 64 steps using information of 6 bits when the "ToS" field in the IP header is redefined as the "DiffServ (DS)" field, or the like.

In the following description, the communication priority level is shown by values of "1" to "9." As the value of the communication priority level increases, the communication has increasing priority over other communication. For example, a communication priority level (in this case, "8") higher than that of the other vehicle information corresponds to the vehicle information used for control of the vehicle M, a communication priority level (in this case, "6") lower than the vehicle information used for control of the vehicle M and higher than the content information corresponds to the vehicle information which is not used for control of the vehicle M and which is not the content information, and the communication priority level (in this case, "3") lower than that of the other vehicle information corresponds to the content information in the vehicle information.

In addition, the communication priority level "8" corresponds to the call information, the communication priority level "4" corresponds to the content information reproduced in the smart phone, and the communication priority level "2" corresponds to the game information. In addition, these communication priorities are exemplary and not limited thereto.

Figures 4, 5:
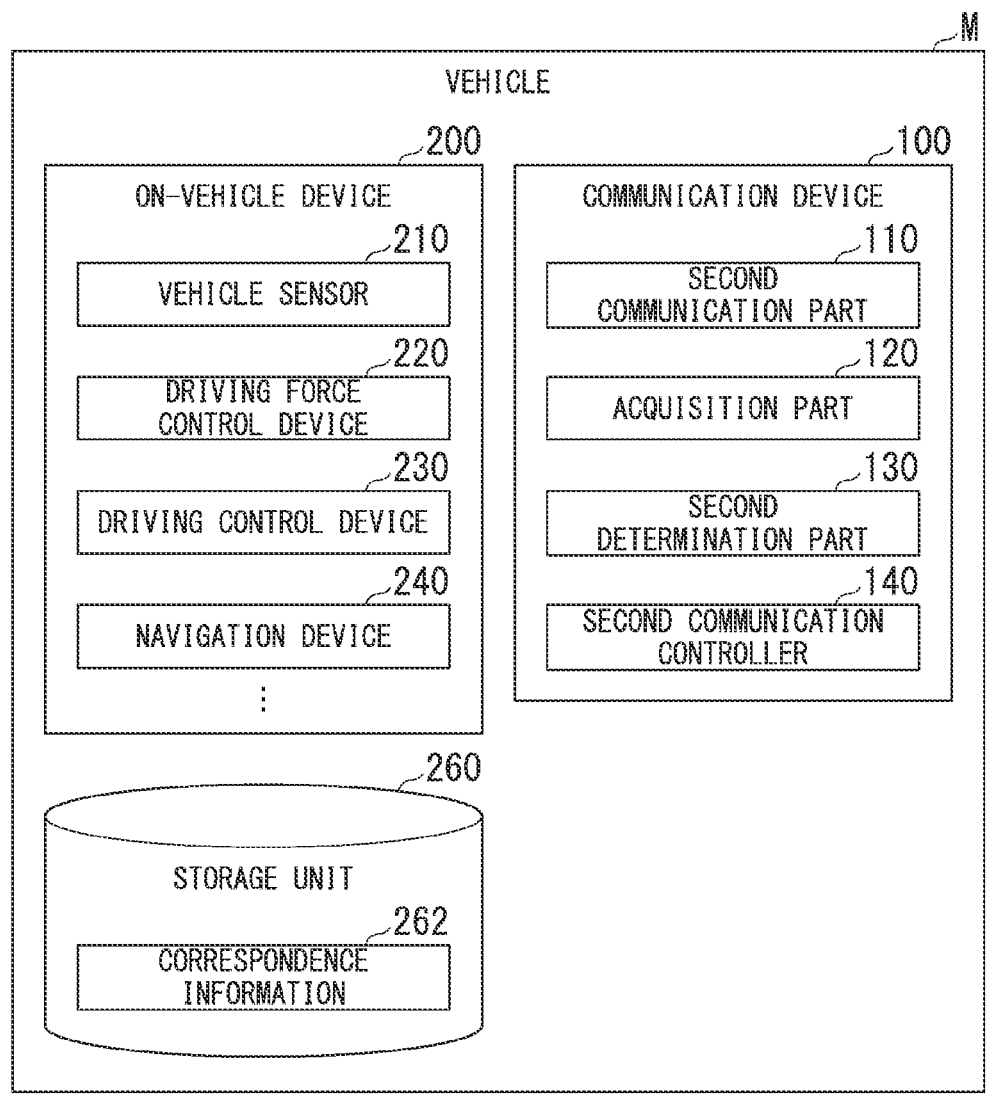
FIG. 4 is a view showing an example of contents of route information.
FIG. 5 is a configuration view of a vehicle including a communication device of the embodiment.

FIG. 4 is a view showing an example of contents of the route information 54. The route information 54 is information used when the first determination part 32 determines which mobile communication network will be used for communication of the transmission data among the mobile communication networks provided within the communication range A in the case in which the radio base station 10 can select communication of a plurality of mobile communication networks. For example, the route information 54 is information in which the information showing the mobile communication network provided by the radio base station 10 and the information showing the communication priority level are associated with each other.

On the basis of the route information 54 shown in FIG. 4, the radio base station 10 performs communication related to the transmission data to which communication priorities of "1" to "4" correspond in the mobile communication network of 4G. In addition, the radio base station 10 performs communication related to the transmission data to which communication priorities of "1" to "2" correspond in the communication band having a narrow bandwidth, and performs communication related to the transmission data to which communication priorities of "3" to "4" correspond in the communication band having a wide bandwidth in the mobile communication network of 4G. The radio base station 10 performs communication related to the transmission data to which communication priorities of "5" to "8" correspond in the mobile communication network of 5G. In addition, the radio base station 10 performs communication related to the transmission data to which communication priorities of "5" to "6" correspond in the communication band having a wide bandwidth, and performs communication related to the transmission data to which communication priorities of "7" to "8" correspond in the communication band having a narrow bandwidth in the mobile communication network of 5G.

Further, in the route information 54 of FIG. 4, while the case in which the communication priority level assigned to each of the mobile communication networks is uniquely determined has been described, there is not limitation thereto. The range of the communication priority level assigned to each of the mobile communication network may be determined by, for example, a threshold or the like. In addition, the route information 54 may be information that differs at each of the radio base stations 10.

Returning to FIG. 2, the first communication part 20 performs wireless communication with the vehicle M or the communication terminal device present in the communication range A via an antenna ANT of the radio base station 10 on the basis of the control of the first communication controller 34.

The communication quality measurement part 30 acquires communication qualities of the mobile communication networks provided in each of the communication range A by the radio base station 10. For example, information related to a latency of the communication is included in the communication quality. The latency is one of indices in the data communication. For example, a delay time of the communication is included in the latency. In addition, the communication quality may be a throughput, a communication speed, a traffic load, a band use rate, the number of error packets, the number of lost packets, or the like.

The first determination part 32 determines a communication priority level assigned to the transmission data on the basis of the transmission data transmitted from transmission source device, the reference information 52, and the information showing the communication quality of each of the mobile communication networks measured by the communication quality measurement part 30. Then, the first determination part 32 determines which mobile communication network will be used for the communication related to the transmission data among the mobile communication networks of 4G or 5G on the basis of the determined communication priority level and the route information 54.

Here, the communication device 100, which will be described below, may request the radio base station 10 to perform communication with the external device TA regarding the transmission data according to the communication priority level different from the previously determined communication priority level in the reference information 52. The different communication priority level is, for example, a communication priority level higher than the communication priority level related to the predetermined transmission data in the reference information 52. The first determination part 32 determines that communication regarding the transmission data is performed by the communication priority level according to a request of a second communication part 110 when there is no influence on other communication, and determines that communication regarding the transmission data is performed by the previously determined communication priority level in the reference information 52 when there is an influence on other communication, in the case in which the communication regarding the transmission data is performed by the communication priority level requested by the communication device 100 on the basis of the information showing the communication quality of each of the mobile communication networks measured by the communication quality measurement part 30.

Not affecting the other communication includes, for example, making the latency, the throughput, the traffic load, the band use rate, the number of error packets, the number of lost packets, or the like, equal to or less than a predetermined threshold, or making the communication speed or the like equal to or more than the predetermined threshold, when the communication device 100 and the external device TA perform communication regarding the transmission data.

Influencing the other communication includes, for example, making the latency, the traffic load, the number of error packets, the band use rate, or the like, larger than the predetermined threshold, or making the communication speed or the like less than the predetermined threshold, when the communication device 100 and the external device TA perform communication regarding the transmission data.

Further, the predetermined threshold may be set to each of the latency, the throughput, the communication speed, the traffic load, the band use rate, the number of error packets, the number of lost packets, and the like, and the first determination part 32 may determine whether it affects other communication by comparing the measurement result of the communication quality measurement part 30 with the predetermined threshold. In this case, the first determination part 32 may determine that communication regarding the transmission data is performed by the previously determined communication priority level in the reference information 52 when it is determined that any one of the latency, the throughput, the communication speed, the traffic load, the band use rate, the number of error packets, and the number of lost packets in the measurement results of the communication quality measurement part 30 influences the other communication, and may determine that communication regarding the transmission data is performed by the previously determined communication priority level in the reference information 52 when it is determined that the measurement results of the predetermined number or more influence the other communication.

In addition, the first determination part 32 may determine that communication regarding the transmission data is performed according to the previously determined communication priority level in the reference information 52 when a previously determined combination (for example, the throughput and the number of error packets, or the like) among the latency, the throughput, the communication speed, the traffic load, the band use rate, the number of error packets and the number of lost packets, which are the measurement results of the communication quality measurement part 30, is determined to affect the other communication.

The first communication controller 34 causes the first communication part 20 to perform communication related to the transmission data transmitted from the transmission source device according to the communication using the mobile communication network based on the determination of the first determination part 32 among the mobile communication network of 4G or 5G. Specifically, the first communication controller 34 performs priority control of the QoS based on the communication priority level based on determination of the first determination part 32 through communication using the mobile communication network based on determination of the first determination part 32, and transmits the information, which includes the determination result showing that the transmission source device and the target device are going to be made to communicate with each other, to the transmission source device. Then, the first communication controller 34 causes the first communication part 20 to perform the communication related to the transmission data according to an absolute priority system in which the transmission data with a high communication priority level has an absolute priority over the transmission data with a low communication priority level, a weighted round-robin system configured to transmit the transmission data according to a ratio of the numbers of transmission data or the number of maximum transmission data which are set to each of the communication priorities, a delay guarantee round-robin system configured to transmit the transmission data according to a maximum transmission delay time set to each of the communication priorities, or shaving or the like based on each of the communication priority level, on the basis of the communication priority level assigned to the transmission data according to response of the radio base station 10 by the transmission source device.

The first communication controller 34 instructs communication according to the communication priority level determined by the first determination part 32 regarding the communication between the communication device 100 of the vehicle M and the radio base station 10 in the communication between the vehicle M and the external device TA. For example, in the case shown in FIG. 1, the vehicle M (the communication device 100) is present in the communication range A-1 of the radio base station 10-1, and the external device TA is connected to the core network cNW to which the radio base station 10-1 is preferentially connected. For this reason, the first communication controller 34 of the radio base station 10-1 requests the radio base station 10-1 to perform communication related to the transmission data according to the communication priority level determined by the first determination part 32, and the radio base station 10-1 determines whether the transmission data is transmitted according to the requested communication priority level.

Further, the first communication controller 34 may request the communication related to the transmission data according to the communication priority level determined by the first determination part 32 in at least a part of the communication path from the vehicle M to the external device TA. For example, the first communication controller 34 of the radio base station 10-1 may request a relay device configured to relay the communication of the core network cNW to perform communication related to the transmission data according to the communication priority level determined by the first determination part 32. In this case, the relay device determines whether communication is performed according to the communication priority level requested from the first communication controller 34 with respect to communication of the core network cNW with the external device TA of a relay destination or the radio base station 10.

[On-Vehicle Device]

Next, the vehicle M including the communication device 100 will be described. FIG. 5 is a configuration view of the vehicle M including the communication device 100 of the embodiment. In the example of FIG. 5, components of the vehicle M used in processing executed by the communication system 1 of the embodiment will be mainly described. The vehicle M includes, for example, the communication device 100, an on-vehicle device 200, and a storage unit 260.

The on-vehicle device 200 includes, for example, a vehicle sensor 210, a driving force control device 220, a driving control device 230, and a navigation device 240. The vehicle sensor 210, the driving force control device 220, the driving control device 230 and the navigation device 240 are example of "the on-vehicle instrument."

The vehicle sensors 210 include, for example, an accelerator opening degree sensor, a vehicle speed sensor, a brake depression amount sensor, and the like. The accelerator position sensor is assigned to an accelerator pedal (an example of an operator) configured to receive an acceleration instruction from a driver in the vehicle M, detects an operation amount of the accelerator pedal, and outputs the detected operation amount to the driving force control device 220 as an accelerator position. The vehicle speed sensor includes, for example, a wheel speed sensor and a speed calculator assigned to each of the wheels, combines the wheel speeds detected by the wheel speed sensors to derive a speed of the vehicle M (a vehicle speed), and outputs the derived vehicle speed to the driving force control device 220. The brake pedaling sensor is assigned to the brake pedal (an example of the operator) configured to receive a deceleration or stopping instruction from a driver, detects an operation amount of the brake pedal, and outputs the detected operation amount to the driving force control device 220 as a brake depression amount.

In addition, the vehicle sensor 210 includes a vehicle speed sensor configured to detect a speed of the vehicle M, an acceleration sensor configured to detect an acceleration, a yaw rate sensor configured to detect an angular speed around a vertical axis, an azimuth sensor configured to detect an orientation of the vehicle M, and the like.

In addition, the vehicle sensor 210 may include, for example, a camera, a radar device, a light detection and ranging (LIDAR) device, an object recognition device, or the like. These components are components configured to detect surroundings information with respect to the vehicle M. The camera is, for example, a digital camera using a solid state image sensing device such as a charge coupled device (CCD), a complementary metal oxide semiconductor (CMOS), or the like. The camera may be a stereo camera. The camera is assigned to an arbitrary place on the vehicle M. When a side in front of the vehicle is imaged, the camera is assigned to an upper section of a front windshield, a back surface of a rearview mirror, or the like. The camera images the surroundings of the vehicle M, for example, periodically and repeatedly.

The radar device radiates radiowaves such as millimeter waves or the like to the surroundings of the vehicle M and detects the radiowaves reflected by an object in the surroundings (reflected waves) to detect at least a position of the object (a distance and an azimuth). The radar device is assigned to an arbitrary place on the vehicle M. The radar device may detect a position and a speed of an object using, for example, a frequency modulated continuous wave (FM-CW) method.

The LIDAR radiates light to the surroundings of the vehicle M (or electromagnetic waves having a wavelength close to that of light) and measures scattered light. The LIDAR detects a distance to an object on the basis of a time from light emission to light reception. The radiated light is, for example, a pulse-shaped laser beam. The LIDAR is assigned to an arbitrary place on the vehicle M.

The object recognition device performs sensor fusion processing with respect to the detection results using some or all of the above-mentioned camera, radar device, and LIDAR, and recognizes a position, a type, a speed, or the like, of an object around the vehicle M. The object recognition device outputs the recognition results to the driving control device 230. In addition, the object recognition device may output the detection results of the camera, the radar device, and the LIDAR to the driving control device 230 as they are. In this case, the object recognition device may be omitted from the vehicle M.

The driving force control device 220 is a device configured to provide a driving force or the like to the vehicle M such that the vehicle M is able to travel. The driving force control device 220 includes, for example, a traveling driving force output device configured to output a traveling driving force (torque) for traveling of the vehicle M as the driving force, a brake device configured to output a brake torque according to a predetermined braking operation to each of the wheels, and a steering device configured to change an orientation of the steered wheels.

The traveling driving force output device includes, for example, a combination of the internal combustion engine, the electric motor, the gearbox, and the like, and an electronic control unit (ECU) configured to control these. The configuration is controlled according to the information input from the driving control device 230 or the information input from the driving operators (the steering wheel, the accelerator pedal, the brake pedal, or the like). The brake device includes, for example, a brake caliper, a cylinder configured to transmit a hydraulic pressure to the brake caliper, an electric motor configured to generate a hydraulic pressure in the cylinder, and a brake ECU. The brake ECU controls the electric motor according to the information input from the driving control device 230 or the information input from the driving operators, and outputs a brake torque to each of the wheels according to a braking operation. The brake device may include a mechanism configured to transmit a hydraulic pressure generated by an operation of the brake pedal included as a driving operator to the cylinder via the master cylinder as a back-up. Further, the brake device is not limited to having the above-mentioned configuration, and may be an electronically controlled hydraulic brake device configured to control an actuator according to the information input from the driving control device 230 and transmit the hydraulic pressure in the master cylinder to the cylinder.

The steering device includes, for example, a steering ECU and an electric motor. For example, the electric motor changes an orientation of the steered wheels by applying a force to a rack and pinion mechanism. The steering ECU drives the electric motor and changes the orientation of the steered wheels according to the information input from the driving control device 230 or the information input from the driving operators.

The driving control device 230 performs, for example, automatic driving (autonomous driving) control, driving assistance control, or the like, of the vehicle M. For example, the automatic driving control controls one or both of steering or a speed of the vehicle M regardless of driving operations of an occupant of the vehicle M. In addition, the driving assistance control may be, for example, driving control of supporting a driving operation of an occupant such as an adaptive cruise control system (ACC), a lane keeping assistance system (LKAS), a collision mitigation brake system (CMBS), or the like. For example, the driving control device 230 may generate driving control contents corresponding to a situation of the surroundings of the vehicle M detected by the vehicle sensors 210, a behavior of the vehicle M, or a control instruction from an occupant, and output the generated driving control contents to the driving force control device 220 to drive the devices. Here, the driving control device 230 may perform automatic driving control, driving assistance control, or the like, on the basis of an instruction from the external device TA, and may perform automatic driving control, driving assistance control, or the like, with reference to the information acquired from the external device TA.

The navigation device 240 includes, for example, a global navigation satellite system (GNSS) receiver, a navigation human machine interface (HMI), and a route determination part. The navigation device 240 holds map information in a storage device such as an HDD, a flash memory, or the like. The GNSS receiver identifies a position of the vehicle M on the basis of the signals received from GNSS satellites. The position of the vehicle M may be identified or corrected by an inertial navigation system (INS) using outputs of the vehicle sensors 210 mounted on the vehicle M. Here, the navigation device 240 may be operated on the basis of an instruction from the external device TA, or may be operated with reference to the information acquired from the external device TA.

The navigation HMI includes a display, a speaker, a touch panel, keys, and the like. The navigation HMI allows an occupant to set a destination using an image, sound, or the like, and guides the occupant on a traveling route to a destination. The route determination part determines, for example, the route (hereinafter, a route on a map) from the position of the vehicle M identified by the GNSS receiver (or an arbitrary input position) to the destination input by the occupant using the navigation HMI with reference to map information. The map information is, for example, information in which road forms are represented using links representing a road and nodes connected by the links. The map information may include a curvature of a road, point of interest (POI) information, or the like. In addition, the map information may include, for example, information on a center of a lane, information on a boundary of a lane, information on types of lanes, or the like. In addition, the map information includes road information, traffic regulation information, address information (address/zip code), facility information, telephone number information, and the like. The map information may be updated at any time by allowing the communication device 100 to communicate with other devices. The navigation device 240 performs route guidance or the like according to displaying of a map image by a display unit and sound output by a speaker (not shown) on the basis of a route on a map.

Further, the on-vehicle device 200 may include, in addition to the above-mentioned devices, at least one of, for example, an audio device, a battery management device, a keyless entry system, a suspension system, an airbag device, a doorlock device, a door opening/closing device, a window opening/closing device, a seat position control device, a rearview mirror angular position control device, a vehicle inside/outside lighting control device, a control device for a wiper or a defogger, a turn signal control device, and an air-conditioning device. Here, the on-vehicle device 200 may be operated on the basis of the instruction from the external device TA, or may execute functions thereof with reference to the information acquired from the external device TA. For example, the audio device may make a request to the external device TA for music, broadcasting information, or the like, and may acquire content information such as the music, broadcasting information, or the like, from the external device TA and output the acquired content. In this case, it is preferable so that the driving control device 230 sets a communication priority level which is relatively lower than the communication priority level for transmission and reception to/from another external device TA.

The communication device 100 includes, for example, the second communication part 110, an acquisition part 120, a second determination part 130 and a second communication controller 140. The components of the communication device 100 are realized by executing a program (software) using a hardware processor such as a CPU or the like. In addition, some or all of these components may be realized by hardware (including a circuit part) such as an LSI, an ASIC, an FPGA, a GPU, or the like, or may be realized by cooperation of software and hardware. The program may have been previously stored in the storage unit 260, and may be stored on a detachable storage medium such as a DVD, a CD-ROM, or the like, and may be installed in the storage unit 260 by mounting the storage medium in the drive device. Some or all of the components of the communication device 100 are examples of a telematics control unit (TCU).

Further, the communication device 100 may include a part of the above-mentioned functional units. For example, the second communication part 110 may be provided in a terminal device having a communication function such as a smartphone or the like outside the communication device 100. In this case, the second communication controller 140 controls an operation of the second communication part 110 provided in such a communication terminal.

The storage unit 260 is realized by, for example, an HDD, a flash memory, an EEPROM, a ROM, a RAM, or the like. For example, correspondence information 262, a program realized by being read by a processor, other various pieces of information, or the like, are stored in the storage unit 260.

Figures 6, 7:
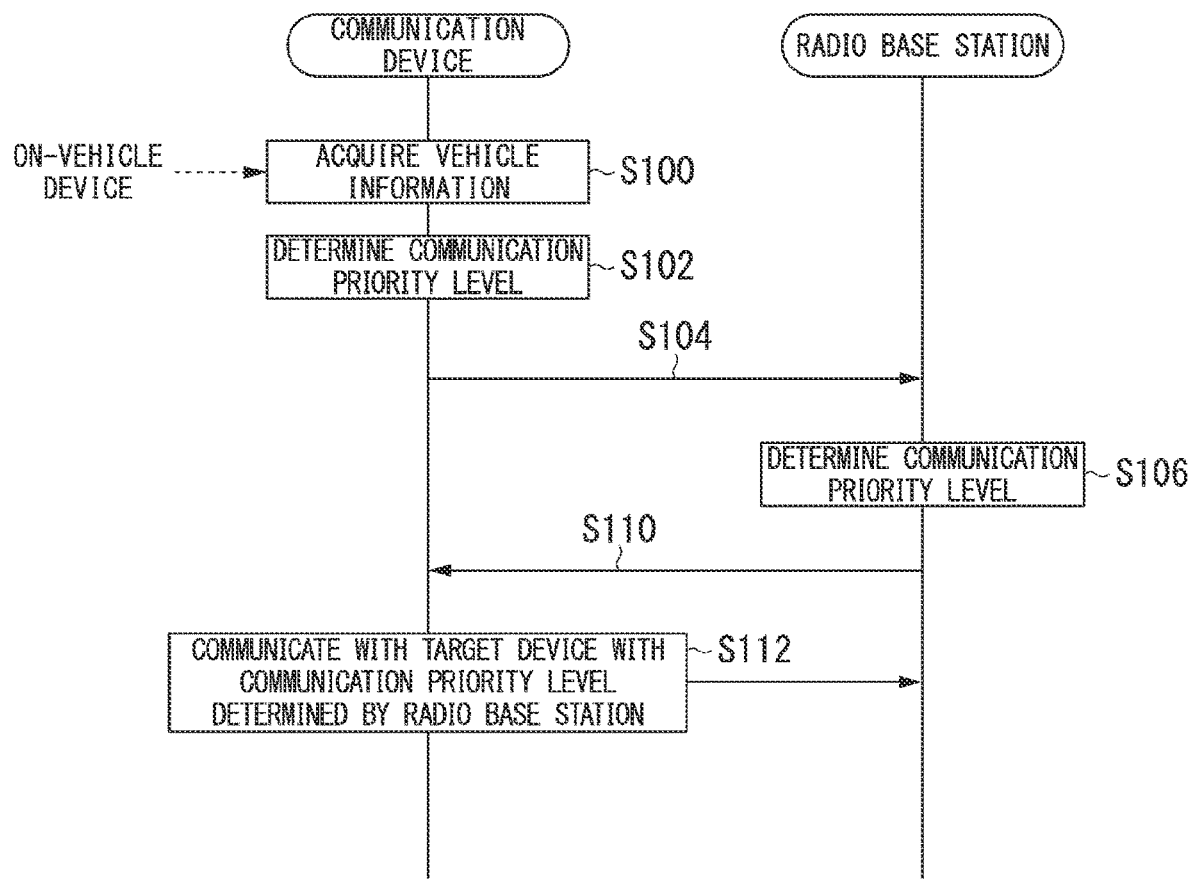
FIG. 6 is a view showing an example of contents of correspondence information.
FIG. 7 is a sequence diagram showing an example of processing executed by the communication system according to the embodiment.

FIG. 6 is a view showing an example of contents of the correspondence information 262. The correspondence information 262 is, for example, information in which communication priorities (a first communication priority level) and types of vehicle information are associated with each other. As described above, a service provider that provides the communication system 1 determines regarding each of transmission data, whether to prioritize transmission and receiving regarding each of transmission data by increasing the communication priority level or not to prioritize transmission and receiving regarding each of transmission data by lowering the communication priority level, according to the reference information 52. Meanwhile, the correspondence information 262 is determined by a salesperson of the vehicle M, a service provider configured to provide services related to the control of the vehicle M (for example, control related to automatic driving or driving assistance), or the like. The correspondence information 262 is information used when communication request with a communication priority level higher than the communication priority level determined in the reference information 52 is requested according to a status (for example, a communication quality) of the mobile communication network even though the communication priority level of the transmission data is basically determined by the reference information 52. In other words, regarding the communication priority level determined in the correspondence information 262 and the communication priority level determined in the reference information 52, the communication priority level of the former is prioritized when used.

In the correspondence information 262 of FIG. 6, like the communication priority level shown in the reference information 52, a communication priority level of "8" is assigned to the information showing the detection results of the vehicle sensors or information used for control of the vehicle M such as image data or the like generated by imaging a surrounding environment of the vehicle M using the camera mounted on the vehicle M, among the vehicle information. Meanwhile, in the correspondence information 262 of FIG. 6, a communication priority level of "8" higher than the communication priority level shown in the reference information 52 is assigned to the information not used for control of the vehicle M such as vehicle position information or the like showing the position of the vehicle M, among the vehicle information.

Further, the information (in this case, information not used for control of the vehicle M) to which a communication priority level higher than the communication priority level shown in the reference information 52 is assigned is an example and not limited thereto. For example, in the correspondence information 262, the communication priority level assigned to the content information reproduced in the vehicle M, information used for automatic driving control, information required for safe traveling of the vehicle M even when not used for automatic driving control, information to which a responsiveness is required, or the like, may have a communication priority level higher than the communication priority level shown in the reference information 52.

For example, the second communication part 110 communicates with the radio base station 10 or other vehicles present around the vehicle M using a cellular network, a Wi-Fi network, Bluetooth (a registered trademark), dedicated short range communication (DSRC), or the like, on the basis of the control of the second communication controller 140. The cellular network is a 3G, 4G, 5G, or the like, mobile communication network, provided in the communication range A by the radio base station 10. The Wi-Fi network is, for example, a radio wave communication network in which each individual or each company can freely use their own network. Communication standards of communication methods compliant with Wi-Fi have an extremely narrow range of radio waves, and there use is limited to within about 10 to 100 [m] from a Wi-Fi antenna position. In addition, in a Wi-Fi network, communication is performed in a predetermined frequency band (for example, a 5 [GHz] band, or a 2.4 [GHz] band).

The acquisition part 120 acquires, for example, information obtained from each on-vehicle instrument provided in the on-vehicle device 200 as vehicle information. The vehicle information includes, for example, information detected by the vehicle sensor 210, control data from the driving force control device 220, control data from the driving control device 230, navigation information from the navigation device 240 (for example, destination information or information on route guidance to a destination), or the like.

The second determination part 130 determines a communication priority level of vehicle information (a first communication priority level) acquired by the acquisition part 120 for each type of vehicle information on the basis of the correspondence information 262.

The second communication controller 140 makes the second communication part 110 to transmit transmission data including the information showing the communication priority level determined by the second determination part 130 and the vehicle information acquired by the acquisition part 120 with respect to the radio base station 10. In the following description, the fact that the second communication controller 140 controls the second communication part 110 such that the transmission data is transmitted to a transmission destination is also described as "the second communication controller 140 transmits the data."

In general, a data quantity (a transmission unit) that can be transmitted at one time in the network is previously determined, and the second communication controller 140 divides the vehicle information into data quantities that can be transmitted at one time, and transmits separate data quantities to the radio base station 10. In this case, the second communication controller 140 firstly transmits the information showing the communication priority level determined by the second determination part 130 to the radio base station 10 through bearer communication before communication of the separate pieces of transmission data is started. Accordingly, the second communication controller 140 requests the radio base station 10 to perform communication according to the communication priority level determined by the second determination part 130.

The radio base station 10 (the first communication controller 34) determines the communication priority level related to the transmission data (a second communication priority level) on the basis of the transmission data transmitted from the second communication controller 140, and transmits the information including the determination result to the communication device 100 through bearer communication as a response with respect to the request. The second communication controller 140 sequentially transmits the separate pieces of transmission data to the external device TA through communication based on the communication priority level determined by the radio base station 10. Further, in the bearer communication, in addition to the information showing the communication priority level, transmission and reception of the information related to the information showing payload information or the information showing a communication path may be performed.

In processing in which "transmitting to the radio base station 10 the transmission data transmitted firstly while including the information showing the communication priority level determined by the second determination part 130 is," the second communication controller 140 is an example of "a starting controller, a first controller," and in processing in which "transmitting to the external device TA sequentially the separate pieces of transmission data through communication based on the communication priority level determined by the radio base station 10," the second communication controller 140 is an example of "a priority level communication controller, a second controller."

[Processing System]

FIG. 7 is a sequence diagram showing an example of processing executed by the communication system 1 according to the embodiment. First, the acquisition part 120 of the communication device 100 acquires vehicle information from the on-vehicle device 200 (step S100). The second determination part 130 determines a communication priority level of the vehicle information (a first communication priority level) acquired by the acquisition part 120 on the basis of the correspondence information 262 (step S102). The second communication controller 140 divides the vehicle information acquired by the acquisition part 120 into data quantities that can be transmitted at one time, and transmits to the radio base station 10 through bearer communication the transmission data firstly transmitted after division while including the information showing the communication priority level determined by the second determination part 130 (step S104).

The first determination part 32 of the radio base station 10 determines the communication priority level assigned to the transmission data (the second communication priority level) on the basis of the transmission data transmitted from the communication device 100 by the first communication part 20, the reference information 52, and the information showing the communication quality of each of the mobile communication networks measured by the communication quality measurement part 30 (step S106). For example, in the case in which the communication regarding the transmission data is performed with a communication priority level (the first communication priority level) requested by the communication device 100 on the basis of the information showing the communication quality of each of the mobile communication networks measured by the communication quality measurement part 30, the first determination part 32 determines that communication regarding the transmission data is to be performed with the communication priority level (the second communication priority level) according to a request of the communication device 100 when there is no influence on other communication, and determines that communication regarding the transmission data is to be performed by a communication priority level (the second communication priority level) which is predetermined in the reference information 52 when there is an influence on other communication. That is, in the case in which the communication regarding the transmission data is to be performed with the first communication priority level requested by the communication device 100 on the basis of the information showing the communication quality of each of the mobile communication networks measured by the communication quality measurement part 30, (i) when there is no influence on other communication, the first determination part 32 determines that communication regarding the transmission data is performed on the basis of the second communication priority level by considering that the first communication priority level, which corresponds to a request of the communication device 100, is the second communication priority level, and (ii) when there is an influence on other communication, the first determination part 32 determines that communication regarding the transmission data is performed with the second communication priority level which is predetermined in the reference information 52.

On the basis of the determination result of the first determination part 32, the first communication controller 34 transmits (notifies) to the communication device 100 information showing whether the communication can be performed according to the communication priority level (the first communication priority level) determined by the second determination part 130 (step S110). When the determination result of the first determination part 32 shows that the communication can be performed according to the communication priority level (the first communication priority level) determined by the second determination part 130, the first communication controller 34 transmits the information showing that the communication is performed according to such communication priority level (considering the first communication priority as the second communication priority level) to the communication device 100, for example. In addition, when the determination result of the first determination part 32 shows that the communication cannot be performed according to the communication priority level (the first communication priority level) determined by the second determination part 130, the first communication controller 34 transmits the information showing that the communication is performed according to the communication priority level (the second communication priority level) determined by the first determination part 32 to the communication device 100. The second communication controller 140 transmits sequentially the divided transmission data to the external device TA through communication on the basis of the communication priority level (the second communication priority level) determined by the radio base station 10 (step S112).

[With Respect to Band Control]

Further, as described above, while the case in which the first determination part 32 determines a communication priority level used for priority control in QoS has been described, there is no limitation thereto. For example, the first determination part 32 may determine the band related to the band control of QoS instead of (or in addition to) processing of determining the communication priority level used for the priority control of QoS.

FIG. 8 is a view showing an example of contents of the reference information 52a used when the first determination part 32 determines a communication band. The reference information 52a is, for example, information in which (i) the identification information that enables identification of the transmission source device of the transmission source of the data, (ii) information showing a type of the transmission source device, (iii) information showing a type of transmission data transmitted from the transmission source device, (iv) the mobile communication network used for communication of the transmission data, and (v) information showing the communication band of the mobile communication network, are associated with each other.

The first determination part 32 determines a mobile communication network used for communication of the transmission data and a communication band in the mobile communication network on the basis of (i) the transmission data transmitted from the transmission source device, (ii) the reference information 52a, and (iii) the information showing the communication quality of each of the mobile communication networks measured by the communication quality measurement part 30. In the reference information 52a of FIG. 8, for example, a communication band having a higher speed and a larger capacity than in the other vehicle information is associated with the vehicle information used for control of the vehicle M, a communication band having a smaller capacity compared to the vehicle information used for control of the vehicle M is associated with the vehicle information not used for control of the vehicle M and not content information, and a communication band having a lower speed and a lower capacity than in the other vehicle information is associated with content information in the vehicle information.

Further, the reference information 52a may include information showing a communication band with no bandwidth guarantee or no bandwidth limitation instead of (or in addition to) information showing a communication band with a narrow bandwidth, or may include information showing a communication band with a bandwidth guarantee or a bandwidth limitation instead of (or in addition to) information showing a communication band with a wide bandwidth. In addition, when the first determination part 32 determines a communication band and a mobile communication network used for communication on the basis of the reference information 52, the route information 54 may not be stored in the storage unit 50.

In addition, for example, the second determination part 130 may determine a band related to the band control of QoS instead of (or in addition to) processing of determining the communication priority level used for priority control in QoS. In this case, instead of (in addition to) the communication priority level, information showing the mobile communication network used for communication of the transmission data and the communication band of the mobile communication network is included in the correspondence information 262. Since processing of determining the communication band of the mobile communication network using the second determination part 130 on the basis of the correspondence information 262 is the same as in the above-mentioned processing, description thereof will be omitted.

[Determination of Communication Priority Level Based on Traveling Information of Vehicle M]

Further, as described above, while the case in which the second determination part 130 determines the communication priority level on the basis of the type of the vehicle information has been described, there is no limitation thereto. The vehicle information includes, for example, status information showing a traveling state of the vehicle M, and the second determination part 130 may determine the communication priority level of the vehicle information on the basis of the status information. The second determination part 130 may determine that a high communication priority level will not be assigned to the vehicle information used for control of the vehicle M, for example, when the status information shows that automatic driving control is not being performed in the vehicle M. In addition, the second determination part 130 may determine that a high communication priority level will not be assigned to vehicle information that is image data from imaging by the camera when the camera of the vehicle M cannot appropriately image the surrounding environment of the vehicle M when the status information shows that the surrounding environment in which the vehicle M is traveling is a poor environment (for example, visibility is bad due to rainfall, snowfall, heavy fog, or the like, or a road surface state is poor). In addition, the second determination part 130 may determine that a high communication priority level will not be assigned to the vehicle position information in the vehicle information since changes (left and right turns, merging of lanes, or the like) in an ambient environment in which the vehicle M is traveling is unlikely to occur when the status information shows that the vehicle M is traveling on a highway. Accordingly, the second determination part 130 can communicate the vehicle information with priority over other information according to the situation of the vehicle M.

[Re-Request for Communication Priority Level]

In addition, as described above, while the case in which a communication with the communication priority level determined by the second determination part 130 is requested to the radio base station 10 but the request was not accepted by the radio base station 10, the second communication controller 140 transmits the transmission data to the external device TA through communication based on the communication priority level determined by the radio base station 10 has been described, there is no limitation thereto. The second communication controller 140 may cancel transmission of the transmission data, for example, when the communication priority level request is not accepted by the radio base station 10, and after a predetermined time, may request the radio base station 10 to perform communication according to the communication priority level determined by the second determination part 130 again.

The second communication controller 140 may transmit the transmission data to the external device TA through communication based on the communication priority level determined by the radio base station 10 when the request is accepted after a predetermined time, and may repeat processing for requesting the radio base station 10 to perform the communication with the communication priority level determined by the second determination part 130 again after a predetermined time until the request is accepted when the request is not accepted. In addition, the second communication controller 140 may transmit the transmission data to the external device TA through communication based on the communication priority level determined by the radio base station 10 when the communication priority level request is not accepted by the radio base station 10 even when the processing for requesting the radio base station 10 to perform the communication with the communication priority level determined by the second determination part 130 has been repeated a predetermined number of times again after a predetermined time. Accordingly, the second communication controller 140 can easily transmit the transmission data according to the communication priority level determined by the second determination part 130. In addition, the second communication controller 140 can prevent the transmission data from being transmitted endlessly by setting a limit on the number of times of retrying requesting.

In addition, the second communication controller 140 may request the radio base station 10 to perform the communication with the communication priority level determined by the second determination part 130 again after the transmission of the transmission data is canceled and the communication quality of the mobile communication network has improved, for example, when the communication priority level request is not accepted by the radio base station 10. In this case, the acquisition part 120 acquires the information showing the communication quality of each of the mobile communication networks measured by the communication quality measurement part 30 of the radio base station 10.

The second communication controller 140 requests the radio base station 10 to perform the communication with the communication priority level determined by the second determination part 130 when it is determined that there is no influence on other communication in the case in which the communication regarding the transmission data is performed according to the requested communication priority level on the basis of the information showing the communication quality of each of the mobile communication networks measured by the communication quality measurement part 30. The second communication controller 140 determines that there is no influence on other communication, for example, when the latency, the throughput, the traffic load, the bandwidth usage, the number of error packets, the number of lost packets, or the like, is a predetermined threshold or less, when the communication speed or the like is a predetermined threshold or more, or the like.

The second communication controller 140 transmits the transmission data to the external device TA through communication based on the communication priority level determined by the radio base station 10 when the request is accepted. Accordingly, the second communication controller 140 can easily transmit the transmission data with the communication priority level determined by the second determination part 130.

Conclusions to Embodiment

As described above, the communication control device of the embodiment (in the example, the communication device 100) includes the acquisition part 120 configured to acquire the vehicle information, which is information related to the vehicle M and which is to be transmitted to an external device outside the vehicle M, from one or more on-vehicle instruments mounted on the vehicle M, the second determination part 130 configured to determine the first communication priority level of the vehicle information for each of the vehicle information on the basis of the vehicle information acquired by at least the acquisition part 120, the starting controller (in the example, the second determination part 130, or the first controller) configured to cause the second communication part 110 to transmit the information showing the first communication priority level determined by the second determination part 130 to the radio base station 10 to which the second communication part 110 accesses to communicate with the external device TA, and the priority level communication controller (in the example, the second communication controller 140, or the second controller) configured to cause the second communication part 110 to perform communication of the vehicle information with the radio base station 10 with the second communication priority level received from the radio base station 10, and thus, the information related to the vehicle can be communicated with priority while securing reliability.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A communication control device comprising:
    an acquisition part configured to acquire vehicle information, which is information related to a vehicle and which is to be transmitted to an external device outside the vehicle, from one or more on-vehicle instrument mounted on the vehicle;
    a determination part configured to determine a first communication priority level of the vehicle information on the basis of at least the vehicle information acquired by the acquisition part;
    a first controller configured to cause a communication part to perform transmission of information showing the first communication priority level determined by the determination part to a radio base station to which the communication part accesses in order to communicate with the external device; and
    a second controller configured to cause the communication part to perform communication of the vehicle information to the radio base station in accordance with a second communication priority level received from the radio base station.

2. A communication device comprising:
    the communication control device according to claim 1; and
    the communication part,
    wherein the communication part performs communication of the vehicle information with the radio base station in accordance with the second communication priority level received from the radio base station.

3. The communication device according to claim 2, wherein the determination part determines the first communication priority level on the basis of status information that shows a traveling state of the vehicle.

4. The communication device according to claim 2, wherein the determination part determines a first communication band for communicating with the radio base station as the first communication priority level of the vehicle information.

5. The communication device according to claim 3, wherein the radio base station assigns a second communication band for communicating with the communication part as the second communication priority level, and
    the communication part performs communication of the vehicle information with the external device by the second communication band which is assigned by the radio base station.

6. The communication device according to claim 3, wherein the second communication priority level is a priority level of Quality of Service (QoS) regarding a channel of wireless communication relayed by the radio base station.

7. A communication system comprising:
    the communication device according to any one of claim 2; and
    the radio base station.

8. A radio base station comprising:
    a communication controller configured to allow a vehicle and an external device to communicate with each other,
    wherein the communication controller causes the vehicle and the external device to communicate with each other on the basis of (i) information showing a first communication priority level of communication related to vehicle information obtained from one or more on-vehicle instrument mounted on the vehicle at between the vehicle and the external device, (ii) information including the vehicle information, and (iii) information showing a communication quality of wireless communication, and
    the first communication priority level is determined on the basis of the vehicle information.

9. The radio base station according to claim 8, further comprising:
    a communication part configured to receive information showing the first communication priority level, which is determined in the vehicle according to a type of the vehicle information, from the vehicle, and transmit a response with respect to the received first communication priority level to the vehicle,
    wherein the communication part determines a second communication priority level on the basis of the information showing the first communication priority level and the information showing the communication quality, transmits the second communication priority level to the vehicle as the response, and receives the vehicle information from the vehicle on the basis of the second communication priority level in communication between the vehicle and the external device.

10. The radio base station according to claim 8, wherein the vehicle information is information showing a detection result of a detection part mounted on the vehicle and configured to detect a state of the vehicle.

11. A communication control method performed by a computer comprising a communication part, the method comprising:
    acquiring vehicle information which is information related to a vehicle obtained from one or more on-vehicle instrument mounted on the vehicle and which is to be transmitted to an external device outside the vehicle;
    determining a first communication priority level of the vehicle information for each of the vehicle information on the basis of the acquired vehicle information;
    causing the communication part to perform transmission of information showing the determined first communication priority level to a radio base station to which the communication part accesses in order to perform communication with the external device; and
    causing the communication part to perform communication of the vehicle information to the radio base station in accordance with a second communication priority level received from the radio base station.

12. A non-transitory computer-readable storage medium on which a program is stored to cause a computer comprising a communication part to;
    acquire vehicle information which is information related to a vehicle obtained from one or more on-vehicle instrument mounted on the vehicle and which is to be transmitted to an external device outside the vehicle;
    determine a first communication priority level of the vehicle information for each of the vehicle information on the basis of the acquired vehicle information;
    cause the communication part to perform transmission of information showing the determined first communication priority level to a radio base station to which the communication part accesses in order to perform communication with the external device; and cause the communication part to perform communication of the vehicle information to the radio base station in accordance with a second communication priority level received from the radio base station.

\* \* \* \* \*